(12) United States Patent
Krieger

(10) Patent No.: US 8,256,793 B1
(45) Date of Patent: Sep. 4, 2012

(54) MULTI-FUNCTIONAL STROLLER AND ASSOCIATED METHOD

(76) Inventor: Cornell J. Krieger, Des Plaines, IL (US)

( * ) Notice: Subject to any disclaimer, the term of this patent is extended or adjusted under 35 U.S.C. 154(b) by 326 days.

(21) Appl. No.: 12/618,284

(22) Filed: Nov. 13, 2009

Related U.S. Application Data

(60) Provisional application No. 61/199,148, filed on Nov. 13, 2008.

(51) Int. Cl.
*B62B 1/00* (2006.01)

(52) U.S. Cl. .......................... 280/650; 280/647; 280/657

(58) Field of Classification Search .................. 280/293, 280/282, 47.371, 735, 642, 650, 652, 658, 280/647, 47.38; 340/573.1, 540, 573.7; 297/250.1; 73/491, 488, 866.5; 446/227, 451, 175
See application file for complete search history.

(56) References Cited

U.S. PATENT DOCUMENTS

| | | | | |
|---|---|---|---|---|
| 5,499,835 A * | 3/1996 | Skirchak et al. | ............ | 280/293 |
| 5,668,333 A * | 9/1997 | Horton et al. | ................ | 446/175 |
| 5,938,216 A | 8/1999 | Weng | | |
| 6,393,348 B1 * | 5/2002 | Ziegler et al. | ................ | 280/735 |
| 6,394,633 B1 | 5/2002 | Perez | | |
| 6,764,133 B2 | 7/2004 | Osato | | |
| 6,997,773 B1 * | 2/2006 | Dubois et al. | ................ | 446/175 |
| 7,049,968 B2 * | 5/2006 | Fitzgerald et al. | ......... | 340/573.1 |
| 7,237,821 B2 * | 7/2007 | Choi | ............................ | 446/227 |
| 7,360,421 B2 * | 4/2008 | Weber et al. | ................... | 73/491 |
| 7,431,630 B2 * | 10/2008 | Dubois et al. | ................. | 446/451 |
| 7,727,078 B2 * | 6/2010 | Arnold et al. | ................. | 446/227 |
| 7,938,731 B2 * | 5/2011 | Papageorge et al. | ....... | 297/250.1 |
| 7,969,316 B2 * | 6/2011 | Stumpf et al. | ............ | 340/573.1 |
| 2003/0132612 A1 * | 7/2003 | Pike et al. | ..................... | 280/642 |
| 2007/0251557 A1 * | 11/2007 | Carter et al. | ................. | 135/25.4 |

* cited by examiner

*Primary Examiner* — Hau Phan

(57) ABSTRACT

A multifunctional stroller includes a frame, a user interface, a light assembly, a music playback device, and a timer-actuated switch electrically coupled directly to a power source. Sensors determine a real-time temperature at the multifunctional stroller and are coupled directly to the timer-actuated switch. Such sensors generate and transmit first, second and third input signals to the timer-actuated switch upon detecting first, second and third triggering events respectively. The user interface generates and transmits first and second control signals to the light assembly and the timer-actuated switch respectively upon receiving corresponding user inputs respectively. The timer-actuated switch is toggled to an open position upon receiving at least one of the first, second and third input signals within a first time period after receiving the second control signal so that power is transmitted to the music playback device for a second time period.

13 Claims, 2 Drawing Sheets

MULTI-FUNCTIONAL STROLLER AND ASSOCIATED METHOD

CROSS REFERENCE TO RELATED APPLICATIONS

This application claims the benefit of U.S. Provisional Application No. 61/199,148, filed Nov. 13, 2008, the entire disclosures of which are incorporated herein by reference.

STATEMENT REGARDING FEDERALLY SPONSORED RESEARCH OR DEVELOPMENT

Not Applicable.

REFERENCE TO A MICROFICHE APPENDIX

Not Applicable.

BACKGROUND OF THE INVENTION

1. Technical Field

This invention relates to children's strollers and, more particularly, to a multi-functional stroller and associated method for providing users with a stroller featuring safety lights, musical devices and customizable wheels for a personalized appearance.

2. Prior Art

There is nothing more special as the anticipated arrival of a new baby. As the expectant mother's belly swells, the joy of the coming birth is made all the more meaningful with each passing day. Parents-to-be attend birthing classes, read books and decorate their nurseries, all in attempts to prepare for the arrival of a new child. Upon the arrival of a new baby, most parents typically stock up on an arsenal of accessories designed to keep a baby comfortable, safe and happy.

Basic furniture items such as cribs, highchairs and changing tables are purchased to meet the child's most basic human needs. A never-ending supply of disposable or cloth diapers, ointment and wipes, ensure that a baby's tender bottom is kept clean, dry and free of irritating and painful diaper rash. Fresh bottles of milk or sippy cups of juice and water must be stored within easy reach to satisfy an infant's empty belly or quench a toddler's thirst. Jars of baby food line cabinet shelves and fruit snacks and baby cookies provide a healthy treat for a grumbling child. Hard teething biscuits and cold teething rings massage sore gums and can calm a crying baby suffering through the onset of first teeth, while small toys, rattles, or a special blanket can entertain and comfort a cranky child.

Perhaps one of the most practical and necessary of all infant accessories is a simple stroller. Used from the time of birth through the toddler years and beyond, strollers are extremely useful devices that provide a comfortable and secure place for the child to sit when strolling through the mall or park with Mom or Dad. Eliminating the need for the parent to continuously carry their child, mist strollers also provide ample storage compartments in which caregivers can store a diaper bag, shopping bags, purses and other personal items, in a secure and efficient manner.

Although baby strollers are indeed practical accessories utilized by most parents and caregivers of small children, use of these products is not always without drawbacks. Specifically, enjoying an evening stroll with one's child can be a challenging endeavor. Not surprisingly, when pushing a stroller during the dusk or evening hours, clearly viewing the road ahead can be difficult. Not being able to see the road ahead, parents often accidentally push the stroller over cracks in the sidewalk, large rocks or uneven pavement, many times resulting in them losing control of the stroller and in worse case scenarios; the stroller becoming off balance and tipping over.

Further, when strolling with a child during the evening hours, pedestrians are more susceptible to being struck by a passing motorist, who simply does not see the parent and child on or near the road. Simply stated, darkened skies combined with minimal street lighting can visually impair a motorist, making spotting pedestrians and others on the road nearly impossible.

In fact, according to a recent study conducted by Tran-Safety Inc., an independent source for publications and information on U.S. road transportation and safety, 80% of pedestrian fatalities occurred after dark. Drivers often stated that they did not see the pedestrians, although a recent study of pedestrian crashes found that crash victims were 2.5 times more likely to be wearing light clothing than dark. Considering the precious cargo transported in the stroller, it is of utmost concern to most conscientious parents that they are clearly visible when strolling at night.

Accordingly, a need remains for a device in order to overcome the above-noted shortcomings. The present invention satisfies such a need by providing a safety stroller device that is convenient and easy to use, lightweight yet durable in design and designed for providing users with an effective means of providing a safer stroller for their children.

BRIEF SUMMARY OF THE INVENTION

In view of the foregoing background, it is therefore an object of the present invention to provide a multifunctional stroller for providing child amusement while ensuring safety during operating conditions. These and other objects, features, and advantages of the invention are provided by a multifunctional stroller including a frame having a plurality of wheels rotatably mated to the frame and a seat attached to the frame. A user interface may be removably attached to the frame and a light assembly may be mated to the frame, the wheels and the user interface respectively. Furthermore, a music playback device is preferably attached to the frame for emitting audible sounds wherein a power source is electrically coupled directly to the user interface.

The multifunctional stroller further includes a timer-actuated switch electrically coupled directly to the power source. Such a timer-actuated switch is communicatively coupled directly to the user interface and the music playback device respectively. A plurality of sensors are attached to the seat and the frame for determining a real-time temperature at the multifunctional stroller. Notably, the sensors are coupled directly to the timer-actuated switch, wherein the sensors generate and transmit first, second and third input signals to the timer-actuated switch upon detecting first, second and third triggering events respectively. The user interface generates and transmits first and second control signals to the light assembly and the timer-actuated switch respectively upon receiving corresponding user inputs respectively.

In this manner, the timer-actuated switch is toggled to an open position upon receiving at least one of the first, second and third input signals within a first time period after receiving the second control signal so that power is transmitted to the music playback device for a second time period. Such a combination of claimed elements provides the unexpected and unpredictable benefit of automatically toggling the music playback device between on and off modes upon detecting the triggering events.

In one embodiment, the light assembly preferably includes a plurality light-emitting diodes positioned along the frame and the wheels.

In one embodiment, the multifunctional stroller may further include an umbrella holding sleeve anchored to the frame, and an umbrella removably attached to the umbrella holding sleeve. Notably, selected ones of the light-emitting diodes are attached to the umbrella holding sleeve and the umbrella respectively.

In one embodiment, the timer-actuated switch flickers between the open position and a closed position upon receiving at least one of the first, second and third input signals within the first time period after receiving the first control signal so that power is intermittingly transmitted to the light assembly for the second time period. In this manner, the light assembly intermittingly flashes on and off as the timer-actuated switch flickers between the open and closed positions respectively. Such a combination of claimed elements provides the unexpected and unpredictable benefit of automatically toggling the light assembly between on and off modes upon detecting the triggering events.

In one embodiment, a snack tray may be removably attached to the frame wherein the user interface is attached to the snack tray and preferably includes a plurality of control buttons for activating the music playback device.

In one embodiment, a pushing handle may be removably attached to the frame, a foot support platform may be removably attached to the frame and a canopy may be attached to the frame.

The present invention further includes a method of utilizing a multifunctional stroller for providing child amusement while ensuring safety during operating conditions. Such a method preferably includes the chronological steps of: providing a frame including a plurality of wheels rotatably mated to the frame and a seat attached to the frame; providing and removably attaching a user interface to the frame; providing and mating a light assembly to the frame, the wheels and the user interface respectively; providing and attaching a music playback device to the frame for emitting audible sounds; and providing and electrically coupling a power source directly to the user interface.

Such a method further includes the chronological steps of: providing and electrically coupling a timer-actuated switch directly to the power source; communicatively coupling the timer-actuated switch directly to the user interface and the music playback device respectively; determining a real-time temperature at the multifunctional stroller by providing and attaching a plurality of sensors to the seat and the frame as well as coupling the sensors directly to the timer-actuated switch; and the sensors generating and transmitting first, second and third input signals to the timer-actuated switch upon detecting first, second and third triggering events respectively.

The method may further include the chronological steps of: upon receiving corresponding user inputs, the user interface generating and transmitting first and second control signals to the light assembly and the timer-actuated switch respectively; and upon receiving at least one of the first, second and third input signals within a first time period after receiving the second control signal, toggling the timer-actuated switch to an open position so that power is transmitted to the music playback device for a second time period.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

It is noted the purpose of the foregoing abstract is to enable the U.S. Patent and Trademark Office and the public generally, especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

BRIEF DESCRIPTION OF THE SEVERAL VIEWS OF THE DRAWING

The novel features believed to be characteristic of this invention are set forth with particularity in the appended claims. The invention itself, however, both as to its organization and method of operation, together with further objects and advantages thereof, may best be understood by reference to the following description taken in connection with the accompanying drawings in which:

Those skilled in the art will appreciate that the figures are not intended to be drawn to any particular scale; nor are the figures intended to illustrate every embodiment of the invention. The invention is not limited to the exemplary embodiments depicted in the figures or the shapes, relative sizes or proportions shown in the figures.

DETAILED DESCRIPTION OF THE INVENTION

The present invention will now be described more fully hereinafter with reference to the accompanying drawings, in which a preferred embodiment of the invention is shown. This invention may, however, be embodied in many different forms and should not be construed as limited to the embodiment set forth herein. Rather, this embodiment is provided so that this application will be thorough and complete, and will fully convey the true scope of the invention to those skilled in the art. Like numbers refer to like elements throughout the figures.

Figure 1:
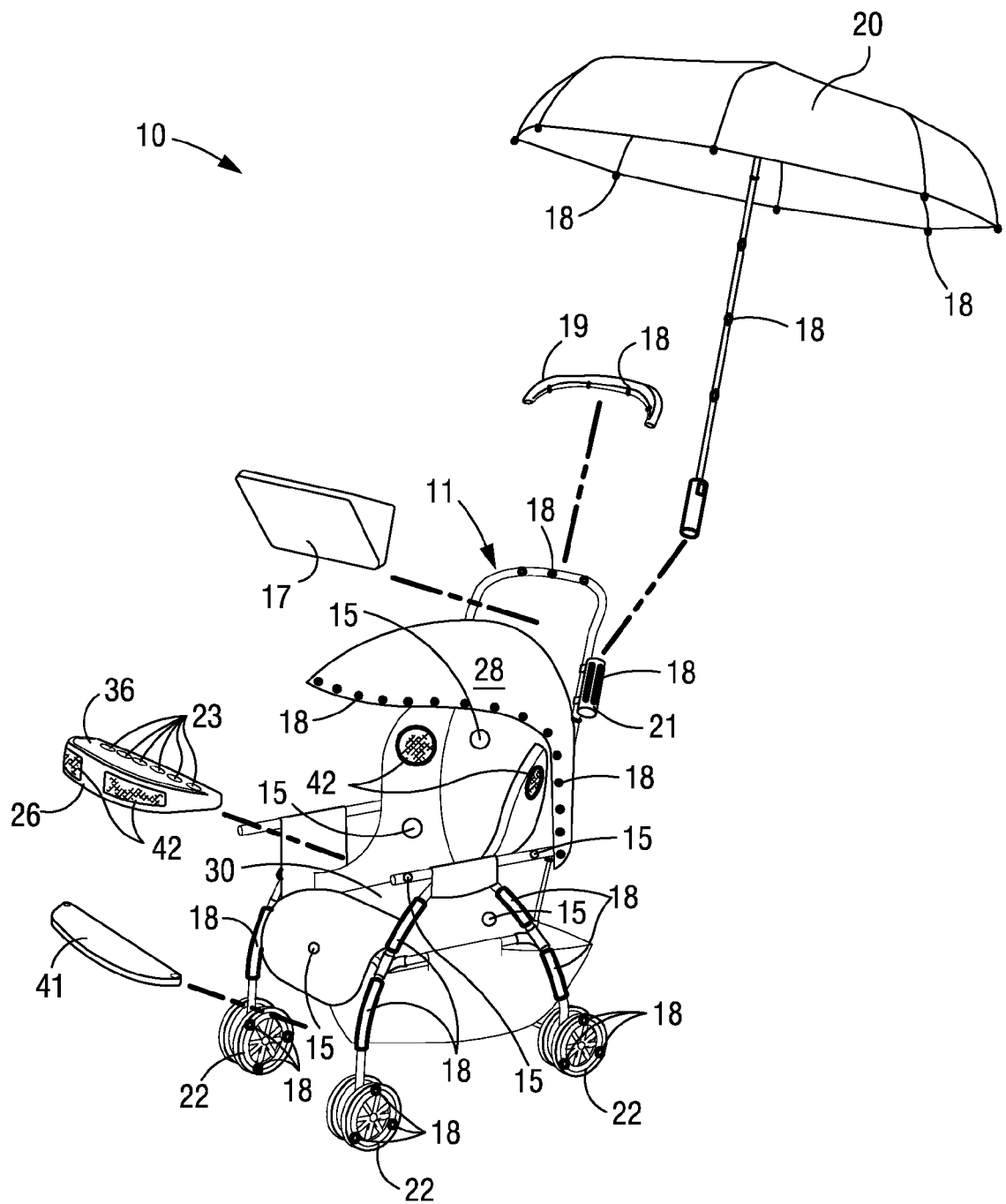
FIG. 1 is an exploded view showing a multifunctional stroller, in accordance with the present invention.
Figure 2:
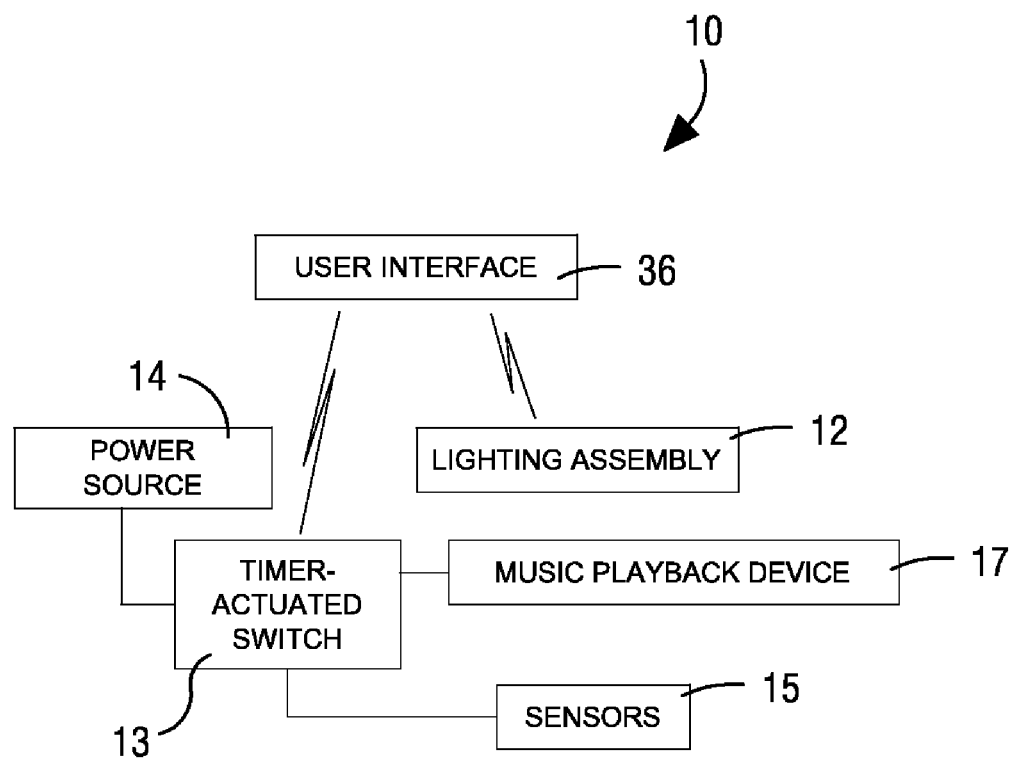
FIG. 2 is a high-level schematic block diagram showing the interrelationship between the major electronic components of the present invention.

The apparatus of this invention is referred to generally in FIGS. 1-2 by reference numeral 10 and is intended to provide a multifunctional stroller 10 for providing child amusement while ensuring safety during operating conditions. It should be understood that the music playback device 17 of the multifunctional stroller 10 may include an IPod, CD/DVD player, MP3 player, radio, or any other type of electronic audible transmitting device.

Referring generally to FIGS. 1-2, the multifunctional stroller 10 preferably includes a frame 11 having a plurality of wheels 22 rotatably mated to the frame 11 and a seat 30 attached to the frame 11. A user interface 36 may be removably attached to the frame 11 and a light assembly 12 may be mated to the frame 11, the wheels 22 and the user interface 36, respectively.

The user interface 36 may include a variety of stand-alone or shared devices that are capable of generating and transmitting a control signal upon receiving a user input. For example, exemplary user interface 36 devices may include a remote controller employing RF, infra-red, acoustic or cellular technology, as well known in the industry. In alternate embodiments, the user interface 36 may include a handheld computer, a PDA, a cell phone, a keyboard, a mouse, etc. that may be comprised of commercially available hardware and software operating systems, for example. The aforementioned user interfaces are intended to represent a broad category of exemplary user interfaces capable of functioning in accordance with the present invention. Of course, the user interfaces may include other components, peripherals and software applications provided they are compatible and capable of cooperating with remaining devices of the present invention. In addition, the user interfaces may include information, documents, data and files needed to provide functionality and enable performance of methodologies in accordance with an exemplary embodiment of the invention.

Furthermore, a music playback device 17 is preferably attached to the frame 11 for emitting audible sounds and a power source 14 is electrically coupled directly to the user interface 36.

The multifunctional stroller 10 further includes a timer-actuated switch 13 electrically coupled directly to the power source 14. Such a timer-actuated switch 13 is communicatively coupled directly to the user interface 36 and the music playback device 17, respectively. A plurality of sensors 15 are attached to the seat 30 and the frame 11 for determining a real-time temperature at the multifunctional stroller 10. Notably, the sensors 15 are coupled directly to the timer-actuated switch 13, wherein the sensors 15 generate and transmit first, second and third input signals to the timer-actuated switch 13 upon detecting first, second and third triggering events, respectively. Such triggering events may be temperature fluctuations, stroller motion, or any other event that is detectable by sensors 15. The user interface 36 generates and transmits first and second control signals to the light assembly 12 and the timer-actuated switch 13, respectively, upon receiving corresponding user inputs, respectively.

In this manner, the timer-actuated switch 13 is toggled to an open position upon receiving at least one of the first, second and third input signals within a first time period after receiving the second control signal so that power is transmitted to the music playback device 17 for a second time period. Such a combination of claimed elements provides the unexpected and unpredictable benefit of automatically toggling the music playback device 17 between on and off modes upon detecting the triggering events.

In one embodiment, the light assembly 12 preferably includes a plurality light-emitting diodes 18 positioned along the frame 11 and the wheels 22.

In one embodiment, the multifunctional stroller 10 may further include an umbrella holding sleeve 21 anchored to the frame 11, and an umbrella 20 removably attached to the umbrella holding sleeve 21. Notably, selected ones of the light-emitting diodes 18 are attached to the umbrella holding sleeve 21 and the umbrella 20, respectively.

In one embodiment, the timer-actuated switch 13 flickers between the open position and a closed position upon receiving at least one of the first, second and third input signals within the first time period after receiving the first control signal so that power is intermittingly transmitted to the light assembly 12 for the second time period. In this manner, the light assembly 12 intermittingly flashes on and off as the timer-actuated switch 13 flickers between the open and closed positions respectively. Such a combination of claimed elements provides the unexpected and unpredictable benefit of automatically toggling the light assembly 12 between on and off modes upon detecting the triggering events.

In one embodiment, a snack tray 26 may be removably attached to the frame 11 wherein the user interface 36 is attached to the snack tray 26 and preferably includes a plurality of control buttons 23 for activating the music playback device 17. Speakers 42 may be situated on the snack tray 26 and along various parts of frame 11.

In one embodiment, a pushing handle 19 may be removably attached to the frame 11, a foot support platform 41 may be removably attached to the frame 11 and a canopy 28 may be attached to the frame 11.

The present invention further includes a method of utilizing a multifunctional stroller 10 for providing child amusement while ensuring safety during operating conditions. Such a method preferably includes the chronological steps of: providing a frame 11 including a plurality of wheels 22 rotatably mated to the frame 11 and a seat 30 attached to the frame 11; providing and removably attaching a user interface 36 to the frame 11; providing and mating a light assembly 12 to the frame 11, the wheels 22 and the user interface 36 respectively; providing and attaching a music playback device 17 to the frame 11 for emitting audible sounds; and providing and electrically coupling a power source 14 directly to the user interface 36.

Such a method further includes the chronological steps of: providing and electrically coupling a timer-actuated switch 13 directly to the power source 14; communicatively coupling the timer-actuated switch 13 directly to the user interface 36 and the music playback device 17, respectively; determining a real-time temperature at the multifunctional stroller 10 by providing and attaching a plurality of sensors 15 to the seat 30 and the frame 11 as well as coupling the sensors 15 directly to the timer-actuated switch 13; and sensors 15 generating and transmitting first, second and third input signals to the timer-actuated switch 13 upon detecting first, second and third triggering events, respectively.

The method may further include the chronological steps of: upon receiving corresponding user inputs, the user interface 36 generating and transmitting first and second control signals to the light assembly 12 and the timer-actuated switch 13 respectively; and upon receiving at least one of the first, second and third input signals within a first time period after receiving the second control signal, toggling the timer-actuated switch 13 to an open position so that power is transmitted to the music playback device 17 for a second time period.

In the alternative embodiment, the device may be designed for jogging in which the device may have three wheels or a deluxe version of the device which may have a sleek design, complimented by hydraulic shock-absorbing wheels, which may feature chrome and spinning rims.

While the invention has been described with respect to a certain specific embodiment, it will be appreciated that many modifications and changes may be made by those skilled in the art without departing from the spirit of the invention. It is intended, therefore, by the appended claims to cover all such modifications and changes as fall within the true spirit and scope of the invention.

In particular, with respect to the above description, it is to be realized that the optimum dimensional relationships for the parts of the present invention may include variations in size, materials, shape, form, function and manner of operation. The assembly and use of the present invention are deemed readily apparent and obvious to one skilled in the art.

What is claimed as new and what is desired to secure by Letters Patent of the United States is:

1. A multifunctional stroller for providing child amusement while ensuring safety during operating conditions, said multifunctional stroller comprising:

a frame including
  a plurality of wheels rotatably mated to said frame, and a seat attached to said frame;
a user interface attached to said frame;
a light assembly mated to said frame, said wheels and said user interface respectively;
a music playback device attached to said frame for emitting audible sounds;
a power source coupled directly to said user interface;
a timer-actuated switch coupled to said power source, said timer-actuated switch further being communicatively coupled directly to said user interface and said music playback device respectively; and
a plurality of sensors attached to said seat and said frame for determining a real-time temperature at said multifunctional stroller, wherein said sensors are coupled directly to said timer-actuated switch;
wherein said sensors generate and transmit first, second and third input signals to said timer-actuated switch upon detecting first, second and third triggering events respectively;
wherein said user interface generates and transmits first and second control signals to said light assembly and said timer-actuated switch respectively upon receiving corresponding user inputs respectively;
wherein said timer-actuated switch is toggled to an open position upon receiving at least one of said first, second and third input signals within a first time period after receiving said second control signal so that power is transmitted to said music playback device for a second time period.

2. The multifunctional stroller of claim 1, wherein said light assembly comprises: a plurality light-emitting diodes positioned along said frame and said wheels.

3. The multifunctional stroller of claim 2, further comprising:
  an umbrella holding sleeve anchored to said frame; and
  an umbrella removably attached to said umbrella holding sleeve;
  wherein selected ones of said light-emitting diodes are attached to said umbrella holding sleeve and said umbrella respectively.

4. The multifunctional stroller of claim 1, wherein said timer-actuated switch flickers between said open position and a closed position upon receiving at least one of said first, second and third input signals within said first time period after receiving said first control signal so that power is intermittingly transmitted to said light assembly for said second time period, wherein said light assembly intermittingly flashes on and off as said timer-actuated switch flickers between said open and closed positions respectively.

5. The multifunctional stroller of claim 1, further comprising:
  a snack tray removably attached to said frame, said user interface being attached to said snack tray and including a plurality of control buttons for activating said music playback device.

6. The multifunctional stroller of claim 1, further comprising:
  a pushing handle removably attached to said frame;
  a foot support platform removably attached to said frame; and
  a canopy attached to said frame.

7. A multifunctional stroller for providing child amusement while ensuring safety during operating conditions, said multifunctional stroller comprising:
  a frame including
    a plurality of wheels rotatably mated to said frame, and a seat attached to said frame;
  a user interface removably attached to said frame;
  a light assembly mated to said frame, said wheels and said user interface respectively;
  a music playback device attached to said frame for emitting audible sounds;
  a power source electrically coupled directly to said user interface;
  a timer-actuated switch electrically coupled directly to said power source, said timer-actuated switch further being communicatively coupled directly to said user interface and said music playback device respectively; and
  a plurality of sensors attached to said seat and said frame for determining a real-time temperature at said multifunctional stroller, wherein said sensors are coupled directly to said timer-actuated switch;
  wherein said sensors generate and transmit first, second and third input signals to said timer-actuated switch upon detecting first, second and third triggering events respectively;
  wherein said user interface generates and transmits first and second control signals to said light assembly and said timer-actuated switch respectively upon receiving corresponding user inputs respectively;
  wherein said timer-actuated switch is toggled to an open position upon receiving at least one of said first, second and third input signals within a first time period after receiving said second control signal so that power is transmitted to said music playback device for a second time period.

8. The multifunctional stroller of claim 7, wherein said light assembly comprises: a plurality light-emitting diodes positioned along said frame and said wheels.

9. The multifunctional stroller of claim 8, further comprising:
  an umbrella holding sleeve anchored to said frame; and
  an umbrella removably attached to said umbrella holding sleeve;
  wherein selected ones of said light-emitting diodes are attached to said umbrella holding sleeve and said umbrella respectively.

10. The multifunctional stroller of claim 7, wherein said timer-actuated switch flickers between said open position and a closed position upon receiving at least one of said first, second and third input signals within said first time period after receiving said first control signal so that power is intermittingly transmitted to said light assembly for said second time period, wherein said light assembly intermittingly flashes on and off as said timer-actuated switch flickers between said open and closed positions respectively.

11. The multifunctional stroller of claim 7, further comprising:
  a snack tray removably attached to said frame, said user interface being attached to said snack tray and including a plurality of control buttons for activating said music playback device.

12. The multifunctional stroller of claim 7, further comprising:
  a pushing handle removably attached to said frame;
  a foot support platform removably attached to said frame; and
  a canopy attached to said frame.

13. A method of utilizing a multifunctional stroller for providing child amusement while ensuring safety during operating conditions, said method comprising the chronological steps of:

providing a frame including a plurality of wheels rotatably mated to said frame and a seat attached to said frame;

providing and removably attaching a user interface to said frame;

providing and mating a light assembly to said frame, said wheels and said user interface respectively;

providing and attaching a music playback device to said frame for emitting audible sounds;

providing and electrically coupling a power source directly to said user interface;

providing and electrically coupling a timer-actuated switch directly to said power source;

communicatively coupling said timer-actuated switch directly to said user interface and said music playback device respectively;

determining a real-time temperature at said multifunctional stroller by providing and attaching a plurality of sensors to said seat and said frame as well as coupling said sensors directly to said timer-actuated switch;

said sensors generating and transmitting first, second and third input signals to said timer-actuated switch upon detecting first, second and third triggering events respectively;

upon receiving corresponding user inputs, said user interface generating and transmitting first and second control signals to said light assembly and said timer-actuated switch respectively; and upon receiving at least one of said first, second and third input signals within a first time period after receiving said second control signal, toggling said timer-actuated switch to an open position so that power is transmitted to said music playback device for a second time period.

* * * * *